United States Patent
Zhong et al.

(10) Patent No.: US 10,645,036 B2
(45) Date of Patent: May 5, 2020

(54) IN-LINE COLLABORATION IN E-MAIL

(71) Applicant: Microsoft Technology Licensing, LLC, Redmond, WA (US)

(72) Inventors: Lin Zhong, Bellevue, WA (US); Shahil Soni, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 15/183,939

(22) Filed: Jun. 16, 2016

(65) Prior Publication Data

US 2017/0366484 A1    Dec. 21, 2017

(51) Int. Cl.
*H04L 12/58* (2006.01)
*G06Q 10/10* (2012.01)

(52) U.S. Cl.
CPC ........... *H04L 51/04* (2013.01); *G06Q 10/107* (2013.01); *H04L 51/16* (2013.01)

(58) Field of Classification Search
None
See application file for complete search history.

(56) References Cited

U.S. PATENT DOCUMENTS

| | | | |
|---|---|---|---|
| 7,546,352 B1* | 6/2009 | Bhattiprolu | G06Q 10/107 709/204 |
| 8,484,297 B2 | 7/2013 | Huang | |
| 8,510,646 B1 | 8/2013 | Young et al. | |
| 8,606,855 B2 | 12/2013 | Bhogal et al. | |
| 8,856,664 B2 | 10/2014 | DeLuca et al. | |
| 9,319,374 B2* | 4/2016 | Ghosh Dastidar | H04L 51/38 |
| 2002/0129109 A1* | 9/2002 | Nozaki | G06Q 10/107 709/206 |
| 2003/0009459 A1 | 1/2003 | Chastain et al. | |
| 2005/0027779 A1 | 2/2005 | Schinner | |
| 2009/0204803 A1 | 8/2009 | Edelen et al. | |
| 2015/0106685 A1 | 4/2015 | Gupta | |
| 2015/0236993 A1 | 8/2015 | Notani | |
| 2015/0281150 A1 | 10/2015 | Masterson et al. | |
| 2016/0364368 A1* | 12/2016 | Chen | H04L 51/04 |

FOREIGN PATENT DOCUMENTS

| | | | | |
|---|---|---|---|---|
| EP | 1 919 825 A1 | 5/2008 | | |
| EP | 1918825 A1 * | 5/2008 | ......... | G06F 17/2785 |
| WO | 2006034384 A1 | 3/2006 | | |

OTHER PUBLICATIONS

International Search Report and Written Opinion for International Patent Application No. PCT/US2017/036660, dated Jul. 31, 2017, date of filing: Jun. 9. 2017, 15 pages.

(Continued)

*Primary Examiner* — Chris Parry
*Assistant Examiner* — Abderrahmen Chouat
(74) *Attorney, Agent, or Firm* — Christopher J. Volkmann; Kelly, Holt & Christenson, PLLC

(57) ABSTRACT

An electronic mail (e-mail) system detects when a user is replying to a particular portion of content in a received message. The reply is automatically formatted to visually distinguish it over replies from other recipients to the same portion of content.

18 Claims, 11 Drawing Sheets

(56) References Cited

OTHER PUBLICATIONS

Norman Walsh: "DocBook 5: The Definitive Guide (Version 1.0.4 for DocBook V5.0)—qandaset", Jun. 6, 2011, Retrieved from the Internet: <URL:http://tdg.docbook.org/tdg/5.0/qandaset.html>, Retrieved on Jul. 14, 2017, 5 pages.
Locsin, Aurelio, "How to Color Code Who Writes What in Google Docs", Published on: Jun. 29, 2014 Available at: http://smallbusiness.chron.com/color-code-writes-google-docs-67311.html.
Prestipino, Pete, "Email Campaigns Get Collaborative at MailChimp", Published on: Apr. 30, 2013 Available at: http://www.websitemagazine.com/content/blogs/posts/archive/2013/04/30/email-campaigns-get-collaborative-at-mailchimp.aspx.
"Meeting Words", Retrieved on: Apr. 14, 2016 Available at: http://meetingwords.com/.
"Collaborative Document Editing", Published on: Jul. 13, 2014 Available at: https://helpcenter.onlyoffice.com/onlyoffice-editors/onlyoffice-document-editor/helpfulhints/collaborativeediting.aspx.
"Zimbra", Retrieved on: Apr. 6, 2016 Available at: https://www.zimbra.com/open-source-email-overview/.
"Office Action issued in European Patent Applitation No. 17731413.5", dated Nov. 14, 2019, 4 Pages.

\* cited by examiner

IN-LINE COLLABORATION IN E-MAIL

BACKGROUND

Computer systems are currently in wide use. Some such computer systems include electronic mail systems. Electronic mail systems allow users to compose, send and receive electronic mail messages and perform other electronic mail system functionality.

It is not uncommon for users of electronic mail systems to attempt to collaborate with one another using the electronic mail system. For instance, an author of an e-mail message may include, in the message content, a list of questions and send the message to multiple different recipients. Each recipient may then reply to each of the questions. This may be done, for example, by a recipient copying and pasting the individual questions into a reply message, and then typing the recipient's individual response to each question, in the reply message. It may also be done by a recipient typing a response in-line with the content of the original email message.

This can become confusing. For instance, one recipient may reply to the questions and then forward his or her replies to the other recipients or to the author, of the original e-mail message, or both. Multiple different recipients may send multiple different replies, and it may be difficult to maintain the integrity of all of the replies.

The discussion above is merely provided for general background information and is not intended to be used as an aid in determining the scope of the claimed subject matter.

SUMMARY

An electronic mail (e-mail) system detects when a user is replying to a particular portion of content in a received message. The reply is automatically formatted to visually distinguish it over replies from other recipients to the same portion of content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
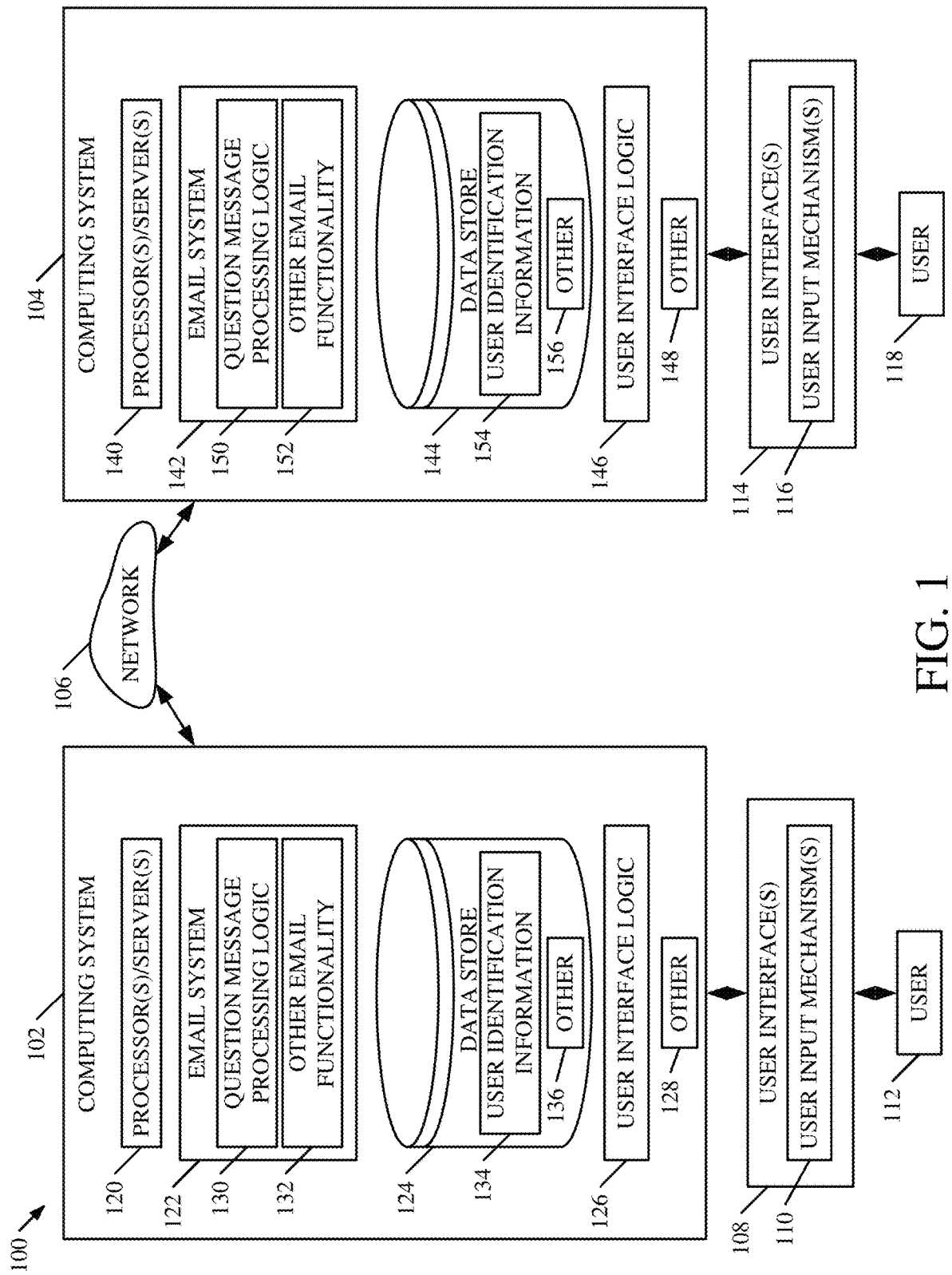
FIG. 1 is a block diagram of one example of a computing system architecture.

FIG. 1 is a block diagram of one example of a computing system architecture 100. Architecture 100 illustratively includes computing systems 102 and 104 connected through network 106. Network 106 can be any of a wide variety of different types of networks, such as a wide area network, a local area network, a cellular network, a near field communication network, among others.

FIG. 1 also shows that, in one example, computing system 102 generates user interfaces 108 with user input mechanisms 110, for interaction by user 112. Computing system 104 also illustratively generates user interfaces 114, with user input mechanisms 116, for interaction by user 118. User 112 illustratively interacts with user input mechanisms 110 in order to control and manipulate computing system 102. User 118 illustratively interacts with user input mechanisms 116 in order to control and manipulate computing system 104.

Before describing the operation of architecture 100 in more detail, an overview of some of the items in architecture 100, and their operation, will first be provided. Computing system 102 illustratively includes processors or servers 120, electronic mail (e-mail) system 122, data store 124, user interface logic 126, and it can include other items 128. E-mail system 122, itself, illustratively includes question message processing logic 130 and it can include a wide variety of other e-mail functionality 132. Data 124 illustratively includes user identification information 134, and it can include other items 136.

E-mail system 122 can be an e-mail service or a client component of an e-mail service, or a combination. It illustratively generates user interface displays with user input mechanisms that allow user 112 to perform electronic mail operations, such as compose messages, send and receive messages, reply to messages, attach items, arrange mailbox folders, etc.

Question message processing logic 130 illustratively allows a user who is composing a message to mark that message as a question message (e.g., a message that conforms to a question message schema), which will be described in greater detail below. In addition, it also automatically identifies when a user is replying to a given portion of content in a received message. It illustratively formats that reply in a way that visually distinguishes it from the original text in the received message, and from any other replies, by other recipients, to that same portion of text. This is also described in greater detail below.

User interface logic 126 illustratively generates user interface displays and detects user inputs from the various user input mechanisms 110 and notifies other components of computing system 102 of those detected inputs. Data store 124 can store, in addition to user identification information 134, applications and a wide variety of other items that can be used by computing system 102.

In the example shown in FIG. 1, computing system 104 also illustratively includes one or more processors or servers 140, e-mail system 142, data store 144, user interface logic 146, and it can include other items 148. E-mail system 142 illustratively includes question message processing logic 150 and a wide variety of other e-mail functionality 152. Data store 144 also illustratively includes user identification information 154, and it can include other items 156.

As with e-mail system 122, e-mail system 142 may be an email service, a client component of a hosted e-mail service, or another type of e-mail system. User interface logic 146 illustratively generates user interfaces 114 and detects user inputs through user input mechanisms 116. It can notify other items of computing system 104 about those inputs so that user 118 can control and manipulate computing system 104.

Figure 2:
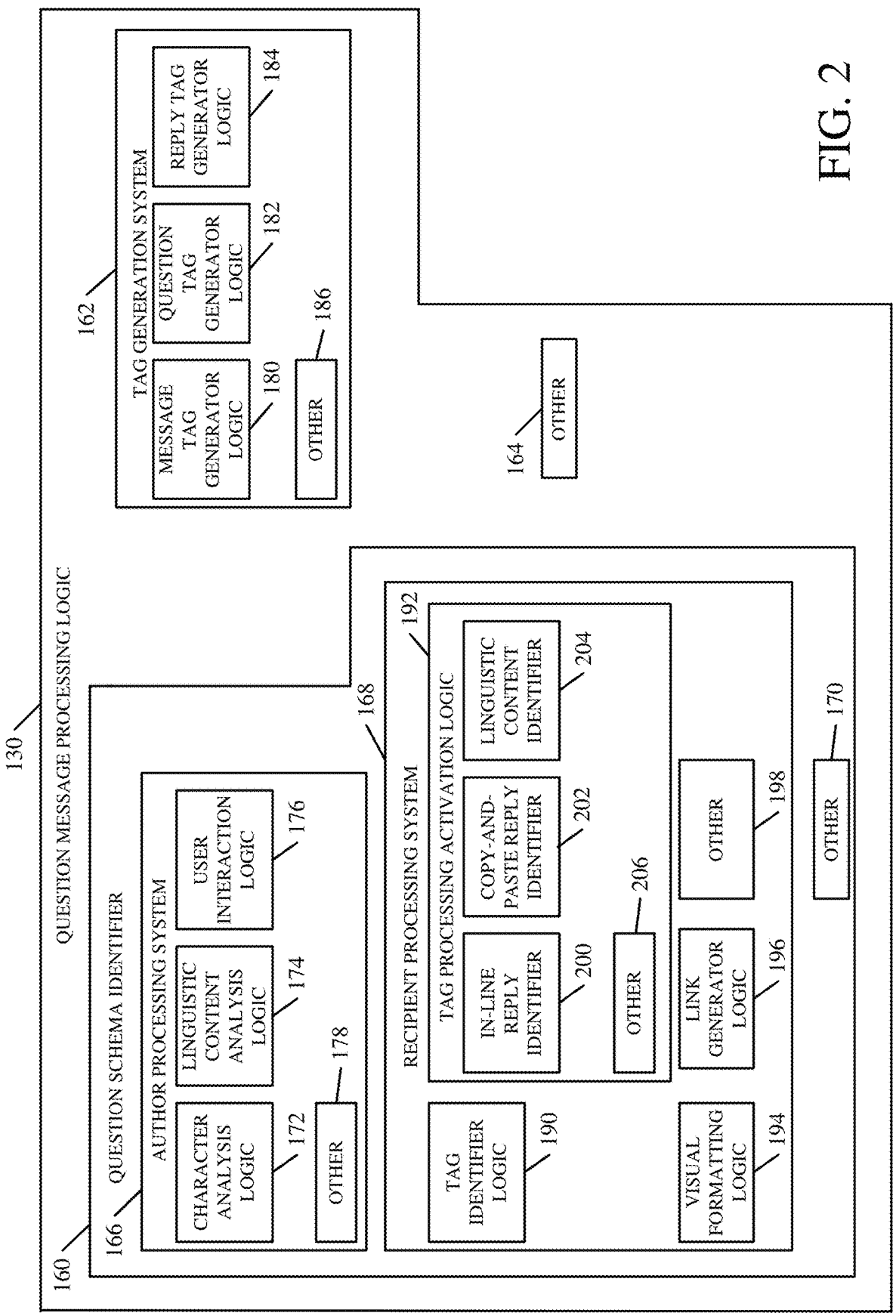
FIG. 2 is a block diagram showing one example of question message processing logic in more detail.

FIG. 2 is a block diagram of one example of question message processing logic 130 in more detail. It will be appreciated that logic 130 will be provided, but it can be the same as question message processing logic 150 on computing system 104, or they can be different. For the sake of the present discussion, it will be assumed that the two are similar, and that they operate similarly. Therefore, the description of question message processing logic 130 may just as easily apply to question message processing logic 150.

Logic 130 illustratively includes question schema identifier 160, tag generation system 162, and it can include a wide variety of other items 164. Question schema identifier 160 illustratively identifies when a message in e-mail system 122 follows a question schema so that it should be processed using logic 130. In one example, it identifies whether an e-mail message being authored by a user follows the question schema (so that it should be treated as a question e-mail and processed using logic 130). The question schema can be any schema in which the email message contains a set of questions or points, to which the message recipients are to respond in a reply message. Thus, the schema may be a series of questions, a series of bullet points, or other schema. Some of these are described in more detail below.

In another example, question schema identifier 160 determines whether a recipient of an e-mail message is replying in a way so that the reply should be treated as a reply to a question e-mail, regardless of whether the original message being replied to follows the question schema. For instance, it may be that the author of the original email did not draft it in a way that follows a question schema, but a recipient is still replying to certain points or textual portions of the original email. Both of these will be described in greater detail below.

Question schema identifier 160 thus illustratively includes author processing system 166 and recipient processing system 168, and it can include other items 170. Author processing system 166 illustratively includes character analysis logic 172, linguistic content analysis logic 174, user interaction logic 176, and it can include other items 178.

Character analysis logic 172 illustratively analyzes the characters in an e-mail message being composed or authored to determine whether it is following a question schema. For instance, if the characters show that the author has typed a number of text fragments followed by question marks, this may indicate that the author is authoring a list of questions and so the e-mail is following the question schema and should be treated as a question e-mail.

Linguistic content analysis logic 174 may include natural language understanding or natural language processing components (or it may have access to those components) that generate an understanding of the semantic or linguistic content of the e-mail to determine whether it should be treated as a question e-mail. For instance, it may be that the author types a sentence fragment such as "Please respond to the following points:" and then lists a set of bullet points. In that case, a semantic analysis of the content of the e-mail may indicate that the e-mail should be treated as a question e-mail, because it is following a question schema.

User interaction logic 176 can be used to solicit input from the user (e.g., author) to confirm whether the e-mail is indeed a question e-mail. For instance, when either logic 172 or logic 174 (or other logic 178) determines that the e-mail being composed may indeed be a question e-mail, then user interaction logic 176 can generate a pop-up display asking the user whether he or she wishes the e-mail to be treated as a question e-mail. In another example, user interaction logic 176 displays a button on the compose pane (or proximate the compose pane) in the e-mail system that the user can actuate to actively indicate that the message is to be treated as a question message. All of these are contemplated herein.

Tag generation system 162 illustratively tags the email message as a question message, once it has been identified as such. In addition, it can tag recipient responses to the various questions posed in the question e-mail so that they can be visually distinguished from one another in the e-mail thread. Thus, tag generation system 162 illustratively includes message tag generation logic 180, question tag generator logic 182, reply tag generator logic 184, and it can include a wide variety of other items 186.

When author processing system 166 identifies a message being authored as a question message, then message tag generator logic 180 tags that message with a tag, indicating so. When individual portions of text within a message have been identified as questions (or otherwise identified as textual points that the recipients are responding to), then question tag generator logic 182 tags that portion of text, in the message, indicating that it is question (or another portion of text that is being responded to). When a user begins to reply to a question (or other portion of text), reply tag generator logic 184 illustratively tags the recipient's reply, and identifies it with the recipient so that it can be distinguished from other replies by other recipients to this question. Thus, system 162 tags question messages, individual questions (or other portions of text being specifically responded to) and replies to the tagged questions.

Recipient processing system 168 illustratively includes tag identifier logic 190, tag processing activation logic 192, visual formatting logic 194, link generator logic 196, and it can include other items 198. Tag identifier logic 190 identifies any tags that are already existing in a message that the recipient is responding to. Tag processing activation logic 192 illustratively identifies when a question (or other textual portion) in the original email message is to be tagged and when a reply is to be tagged, and activates tag generation system 162 so that it generates a tag for the question and/or portions of the reply message.

Logic 192 thus includes in-line reply identifier 200 that identifies when the recipient is generating a reply, in-line with the other message content in the original message that is being replied to. When this is detected, this indicates that the recipient is replying to a particular portion of text in the original message. Thus, identifier 200 provides an indication of this to tag generation system 162. Question tag generator logic 182 then identifies the particular portion of text immediately above where the recipient is entering the reply, as a question or other point in the original e-mail message that is being replied to, and tags it as such. Reply tag generator logic 184 tags the recipient's reply (e.g., the content that the recipient is currently entering) as a reply to the question tagged above, and correlates the reply to the particular recipient that is generating it. In this way, the recipient's reply can be distinguished not only from the question in the original e-mail message, but also from replies by other recipients.

Copy and paste reply identifier 202 identifies when the recipient copies and pastes a portion of the original e-mail message (the message being replied to) into the reply pane. This also indicates that the recipient is replying to a particular portion of text in the original message. Identifier 202 thus indicates this to tag generation system 162. In response, question tag generator logic 182 identifies the portion of text that the recipient copied and pasted as a question (or other textual portion to which the recipient is replying), and tags it as such. Reply tag generator logic 184 identifies the content being entered by the recipient as a reply to the question identified above. It tags it as such, and identifies the recipient as the person entering the reply.

Linguistic content identifier 204 identifies a portion of text in the received message as a question (or other textual portion to which the recipient is replying), based upon the linguistic content of the recipient's reply. For instance, assume that the recipient begins to type, in a reply message such as, "In response to point one below:". This illustratively indicates that the recipient is replying to a particular question or textual point in the original e-mail message. Linguistic content identifier 204 indicates this to tag generation system 162. In response, question tag generator logic identifies the particular textual portion of the original message that corresponds to "point one below" and tags it as a question. It can do this in a variety of different ways. For instance, it may include natural language processing or natural language understanding components (or have access to such components) that correlate the recipient's reply to a portion of text in the original message. It can identify that text in other ways as well. Reply tag generator logic 184 also tags the recipient's reply as a reply to the identified question, and associates that reply with this particular recipient.

Visual formatting logic 194 automatically formats the recipient's reply, once it has been tagged (or otherwise identified) as a reply to a particular question or point in the original e-mail message. Logic 194 illustratively formats it so that it is visually distinguishable from the text in the original e-mail message, and from any other replies to this particular question, from any other recipients. In one example, logic 194 can change the size, thickness, color, or other characteristic of the text being entered by the recipient. It can change the indent or spacing of the text. It can change the font, or it can change background shading or any other visual characteristic of the reply to visually distinguish it from the original text and from other replies by other recipients. In one example, this is automatically done so the recipient need not change any formatting manually. Instead, once it has been identified that the recipient is responding to a question (or other particular textual portion) in the original message, logic 194 automatically formats the recipient's reply in this way, and the recipient simply needs to type the reply.

Link generator logic 196 illustratively generates a link from the recipient's reply to underlying identification or biographical information 134 (or 154) for this recipient (which may be stored in data store 124 or 144 or elsewhere). It may also generate a header portion for the recipient's reply to identify the recipient and to serve as the visual display element corresponding to the link. For instance, just preceding the recipient's reply, or just above it, link generator logic 196 may generate text such as "Gabe's reply:" to indicate that the following text is the reply from the particular recipient "Gabe". When another user hovers his or her mouse over that link, it may provide a summary of the biographical information for the corresponding recipient (e.g., for Gabe), and when the user actuates the link, it may navigate the user to a more detailed biographical description of that recipient, or it may generate that information on a pop-up display, or in other ways.

Figure 3:
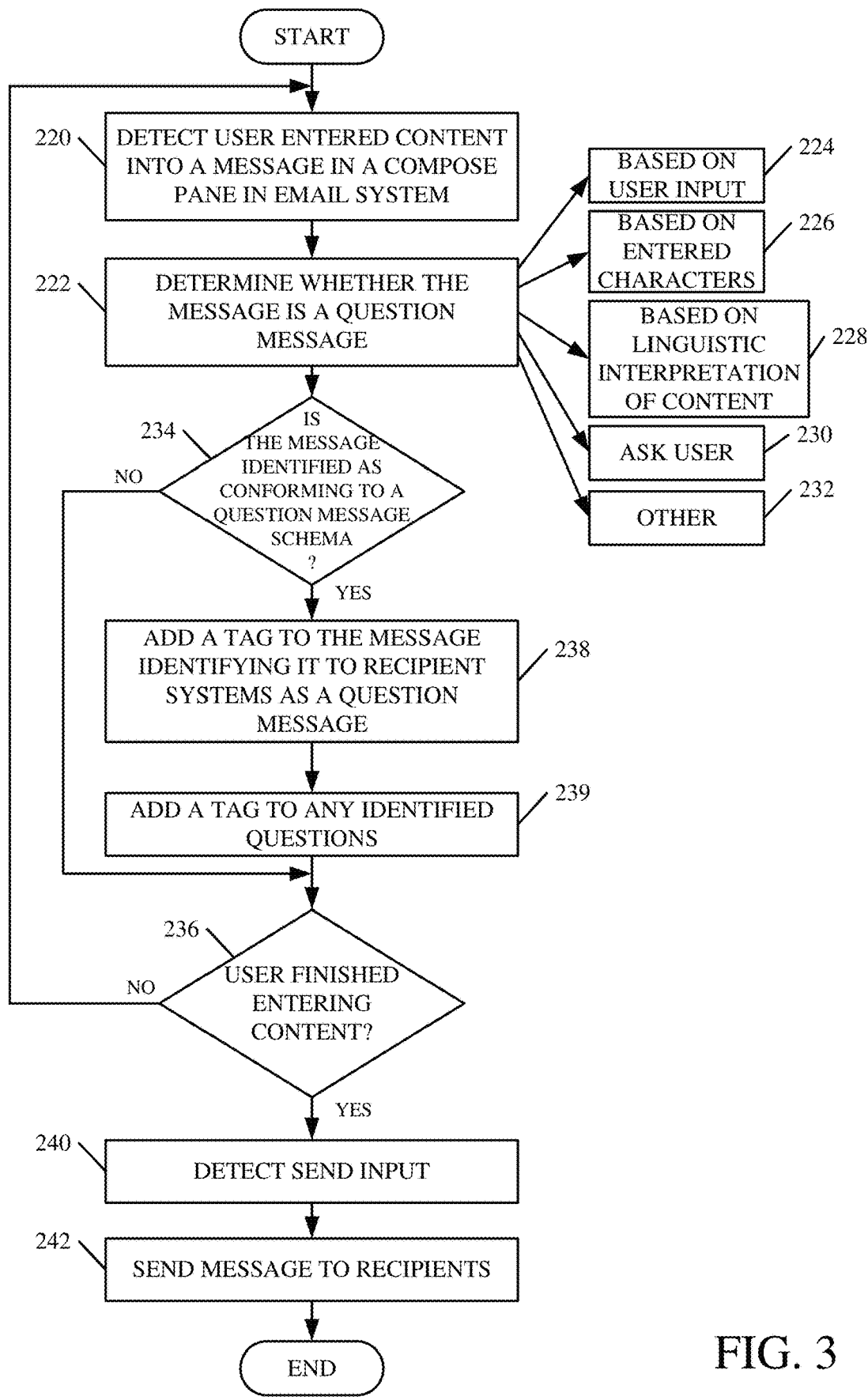
FIG. 3 is a flow diagram illustrating one example of the operation of the architecture shown in FIG. 1 in allowing a user to author a question message in an e-mail system.

FIG. 3 is a flow diagram illustrating one example of the operation of architecture 100 in allowing a user to author an e-mail, and to analyze the e-mail to determine whether it follows a question schema and should therefore be processed as a question e-mail. In the example described herein, it will be assumed that user 112 is authoring the e-mail message using e-mail system 122. It will also be assumed that user 118 is a recipient of that e-mail message.

It is first assumed that e-mail system 122 is open and running and that it is displaying a compose pane so that user 112 can compose an e-mail message. E-mail system 122 first detects that user 112 has entered content into a message in the compose pane in e-mail system 122. This is indicated by block 220 in FIG. 3.

Author processing system 166 then determines whether the message follows a question schema and therefore should be treated as a question message. This is indicated by block 222. In one example, this can be based on a user input, such as the user actuating an actuator to indicate that the message is a question message, and this will be detected by user interaction logic 176. Determining that the message is a question message based on a user input is indicated by block 224 in the flow diagram of FIG. 3.

The determination of whether the email message being authored conforms to a question schema can also be made based on an analysis of the particular characters entered into the message by user 112. For instance, character analysis logic 172 can identify that the user has entered a plurality of different text fragments each followed by a question mark. Determining that the email message conforms to a question message schema based on entered characters is indicated by block 226.

Linguistic content analysis logic 174 can also identify the message as a question message based upon the linguistic or semantic content of the message. This is indicated by block 228.

In one example, user interaction logic 176 can ask the user to confirm that the message should be treated as a question message. This is indicated by block 230. Determining whether the message is a question message can be performed in other ways as well, and this is indicated by block 232.

If the user is still entering text or content into the message, but the message has not yet been identified as a question message, then processing reverts to block 220, where the system continues to determine whether the message is identified as a question message based on entered content. This is indicated by blocks 234 and 236 in FIG. 3.

However, if, at block 234, it is determined that the message has been identified as a question message, then message tag generator logic 180 adds a tag to the message identifying it to any recipient e-mail systems (such as e-mail system 142 in computing system 104) as a question message, or a message that conforms to the question schema. This is indicated by block 238 in FIG. 3. The components of author processing system 166 can also identify particular questions once the message is identified as a question message. Question tag generator logic 182 illustratively tags those questions as such. This is indicated by block 239.

At some point, user 112 will finish composing the message and actuate a send actuator to send the e-mail to one or more recipients. Detecting the user actuation of the send actuator and sending the message to the identified recipients is indicated by blocks 240 and 242 in the flow diagram of FIG. 3.

Figure 4:
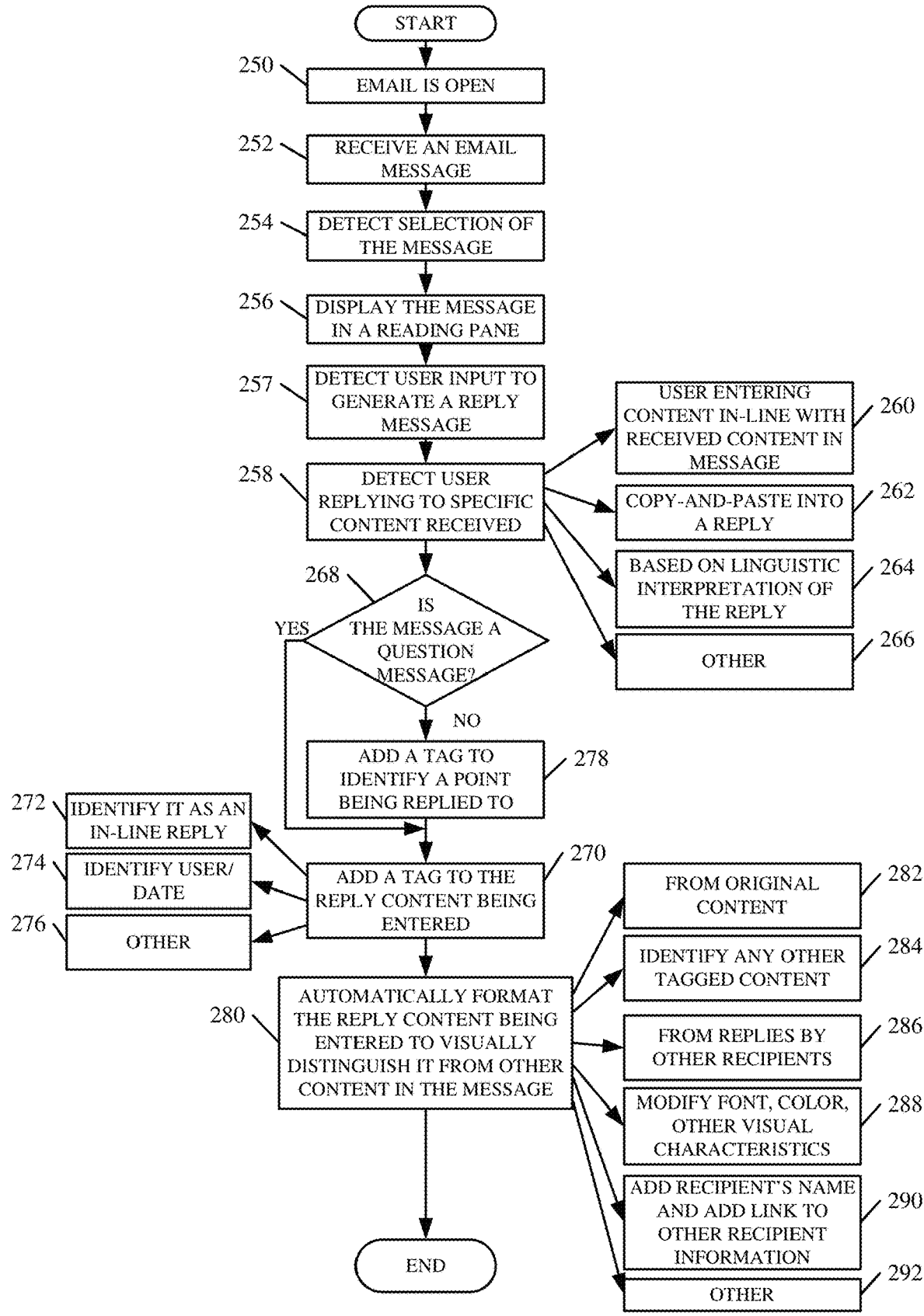
FIG. 4 is a flow diagram illustrating the operation of the architecture shown in FIG. 1 in automatically formatting replies to a message in an e-mail system.

FIG. 4 is a flow diagram illustrating the operation of items in FIGS. 1 and 2 in automatically formatting replies to a question message. It is first assumed that user 118 has his or her e-mail system 142 opened and running. This is indicated by block 250 in the flow diagram of FIG. 4. E-mail system 142 then receives an e-mail message (e.g., the message authored by user 112). This is indicated by block 252. User 118 then selects the message for display. This is indicated by block 254. E-mail system 142 then displays the selected message in a reading pane for user 118. This is indicated by block 256. User 118 then actuates a reply actuator to generate a reply to the email message. This is indicated by block 257.

Assuming for the sake of the present discussion that question message processing logic 150 is similar to logic 130, shown in FIG. 2, recipient processing system 168 then detects that user 118 is replying to specific content in (or a particular textual portion of) the received message. This is indicated by block 258 in the flow diagram of FIG. 4. In one example, in-line reply identifier 200 identifies that the user is entering content in-line with received content in the received message. This is indicated by block 260 in the flow diagram of FIG. 4. In another example, copy and paste reply identifier 202 identifies that the recipient has copied and pasted a portion of the received message into a reply pane, and is entering content relative to that copied and pasted portion in the reply pane. This is indicated by block 262 in FIG. 4. In yet another example, linguistic content identifier 204 identifies that the recipient is replying to a certain portion of the received e-mail message based on a linguistic or semantic interpretation of the content being entered by the recipient in the reply pane. This is indicated by block 264. Detecting that the recipient is replying to specific content in the received message can be identified in other ways as well, and this is indicated by block 266.

In one example, tag identifier logic 190 can then identify whether the received message has already been tagged as a question message. This is indicated by block 268 in FIG. 4. If so, then the questions in the original message may have already been tagged as well. In that case, reply tag generator logic 184 adds a tag to the content being entered by this recipient, as a reply to an already-tagged question. This is indicated by block 270. As discussed above, the tag may identify it as an in-line reply as indicated by block 272, it may identify the user and date of the reply as indicated by block 274, or can be identified in other ways as well, and this is indicated by block 276.

However, at block 278, it may be that the received message was not previously tagged as a question message. In that case, question tag generator logic 182 then adds a tag to identify the particular textual portion of the received message that user 118 is replying to. This is indicated by block 278. For instance, as discussed above, once it has been identified that the user is replying to a specific portion of text in the received message, that specific portion of text is identified and tagged by question tag generator logic 182 as a question or point that the user is replying to. Then, as indicated at block 270, reply tag generator logic 184 again tags the recipient's reply to that question with a tag indicating that it is in reply to the previously tagged question.

In addition, once it has been identified that the present recipient (user 118) is replying to a specific portion of the received message, then visual formatting logic 194 automatically formats the content being entered by this recipient (user 118) to visually distinguish it from other content in the reply message. This is indicated by block 280 in the flow diagram of FIG. 4. In one example, logic 194 formats it to distinguish it from the original text in the message to which the recipient is replying. This is indicated by block 282. In another example, logic 194 formats the recipient's reply to distinguish it from any other tagged content (e.g., any other replies to this question by other recipients, etc.). This is indicated by blocks 284 and 286.

Logic 194 can do this in a variety of ways. For instance, it can modify the font, color, line thickness, spacing, letter size, background color or shading or a wide variety of other visual characteristics of the content that the recipient is inserting. This is indicated by block 288.

Link generator logic 196 can also add the recipient's name or other identifying information, and it can add a link to other recipient information 154 as well. This is indicated by block 290 in the flow diagram of FIG. 4. Logic 194 and logic 196 can operate in a wide variety of other ways as well, and this is indicated by block 292.

Figure 5A:
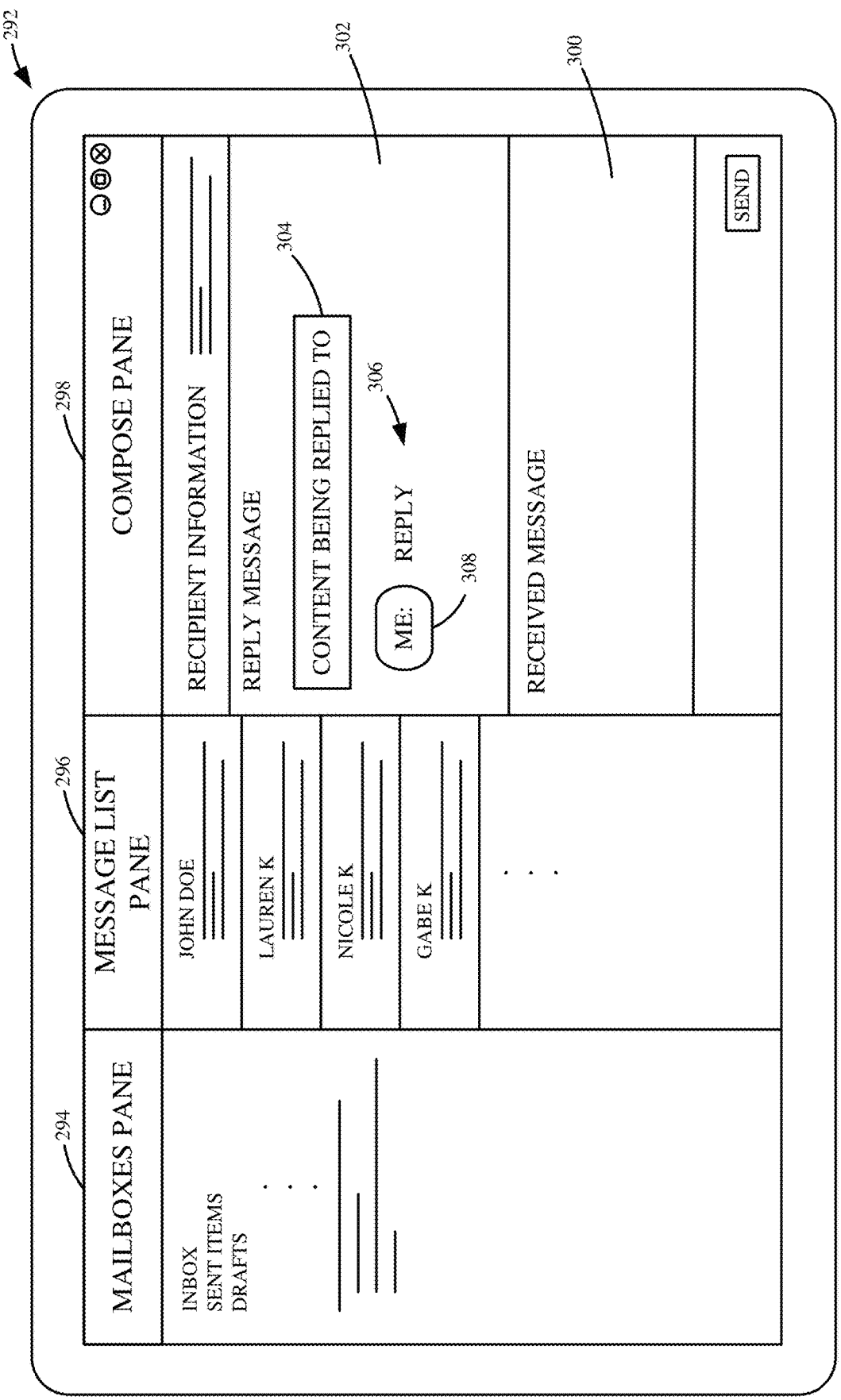
FIGS. 5A and 5B show examples of user interface displays.
Figure 5B:
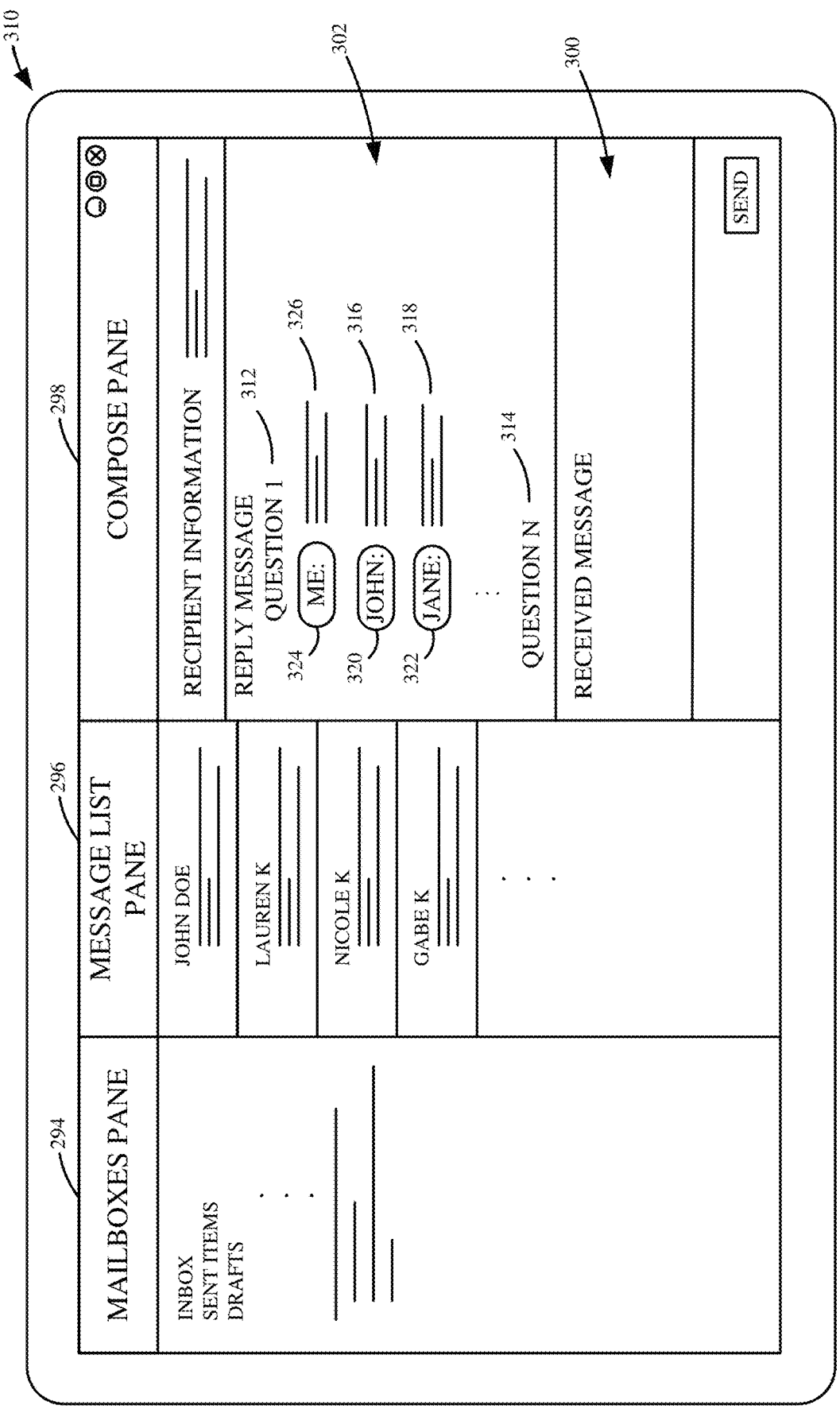

FIGS. 5A and 5B show examples of user interface displays. FIG. 5A is one example of a user interface display 292 in e-mail system 142. It allows user 118 to compose an e-mail message or a reply message, or both. Display 292 illustratively includes a mailboxes pane 294, a message list pane 296 and a compose pane 298. Mailboxes pane 294 illustratively lists the various mailboxes that the user has configured on the e-mail system, such as an inbox, a sent items box, a drafts box, etc. Message list pane 296 illustratively includes identifying information identifying messages that have been received by the user in the user's inbox. Compose pane 298 illustratively allows the user to input message content in order to compose or reply to a message.

In the example shown in FIG. 5A, pane 298 includes a received message display pane 300 and a reply message compose pane 302. Received message display pane 300 illustratively displays a received message that user 118 has selected from message list pane 296 for viewing. The user 118 then actuates a user input mechanism indicating that the user wishes to generate a reply to that message, and the received message is displayed in pane 300, while the reply message compose pane 302 allows the user to input content for a reply message.

In generating the reply message, user 118 can do a number of different things. For instance, the user can place his or her cursor in the received message pane 300, in-line with the received message content, and begin typing an in-line reply. In another example, as discussed above, user 118 can copy and paste information from received message shown in pane 300 into the reply message in pane 302 and enter responsive content. In yet another example, the user can enter content into pane 302 that linguistically indicates that user 118 is replying to a certain textual portion or question in the received message.

In the example shown in FIG. 5A, it can be seen that the user 118 has copied and pasted a particular portion of the content of the received message into the reply message compose pane 302 and it is identified as the content being replied to 304. The user then begins entering content 306 as a reply. It can be seen in FIG. 5A that link generator logic 196 illustratively adds a link 308 identifying the recipient 118 that is replying and linking to additional biographical information about the recipient. In addition, visual formatting logic 194 illustratively formats reply 306 (as well as link 308) to visually distinguish it from the content 304 being replied to. Thus, the user (and a subsequent recipient of the reply) can easily distinguish between the content being replied to 304 and the reply 306 associated with user 118.

FIG. 5B is another example of a user interface display 310. Some items of user interface display 310 are similar to those shown on display 292 in FIG. 5A, and they are similarly numbered. In the example shown in FIG. 5B, it is assumed that the received message in pane 300 was already tagged as a question message. Therefore, when user 118 actuates a user input mechanism indicating that user 118 wishes to generate a reply to the message, visual formatting logic 194 generates a reply format such as that shown in pane 302. The reply message in pane 302 illustratively shows each of the questions 312-314 that were tagged in the original received message in pane 300, and it also illustratively shows various replies 316-318 from different recipients that have already replied to the original message. Each of those replies 316-318 are formatted differently from one another and differently from the original text in the question 312 to which they respond. In addition, each of the replies 316-318 has a corresponding link 320-322 that identifies the author of that particular reply.

FIG. 5B also shows that, in one example, link generator logic 196 generates a link 324 for the particular user 118 that is about to enter responsive information and places the cursor 326 at a location where user 118 simply needs to begin entering content in reply to question 312. In one example, visual formatting logic 194 also formats the link 324 and any content entered by user 118 so that it is visually distinguished from the other replies 316-318, and also from the question 312 to which it responds.

It can thus be seen that the present system advantageously saves processing and memory overhead, and also decreases network bandwidth requirements for an e-mail system. By automatically detecting when a user is responding to a particular portion of a received e-mail, and then automatically formatting the response to visually distinguish the user's reply from other replies, and from the original message content, the system avoids the need for the user to navigate to various formatting displays and choose options for formatting a response. All of this saves rendering overhead, which reduces processing and memory requirements. In addition, it increases the usability of the system and reduces user fatigue (which increases accuracy), because users can generate responses more quickly, and they can more quickly distinguish among the responses of various users.

The present discussion has used the term "automatically." By "automatically" it is meant that the operation is performed without further user input, except perhaps to initiate or authorize the operation.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has also mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
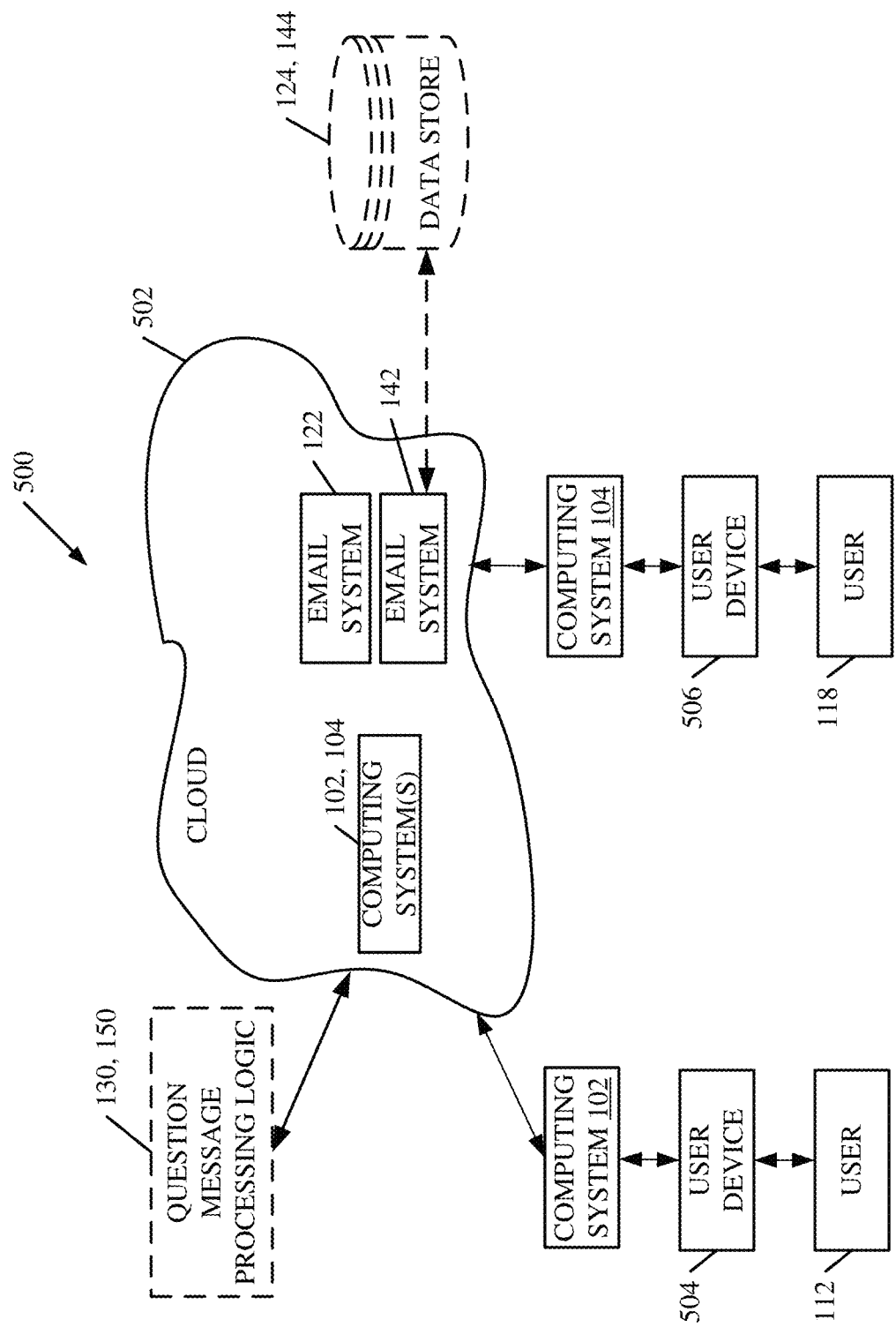
FIG. 6 is a block diagram of one example of the architecture shown in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing systems 102 and 104 can be the same or different systems and they can be located in cloud 502 or outside of it. FIG. 6 also shows that email system 122 and/or email system 142 can be located in cloud 502 (which can be public, private, or a combination where portions are public while others are private). They can also be the same email system. Therefore, user 112 uses a user device 504 to access those systems through cloud 502, and user 118 uses a user device 506.

FIG. 6 also depicts another example of a cloud architecture. FIG. 6 shows that it is also contemplated that some elements of architecture 100 can be disposed in cloud 502 while others are not. By way of example, data stores 122, 144 can be disposed outside of cloud 502, and accessed through cloud 502. In another example, question message processing logic 130, 150 can be outside of cloud 502. Regardless of where they are located, they can be accessed directly by devices 504 and 506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
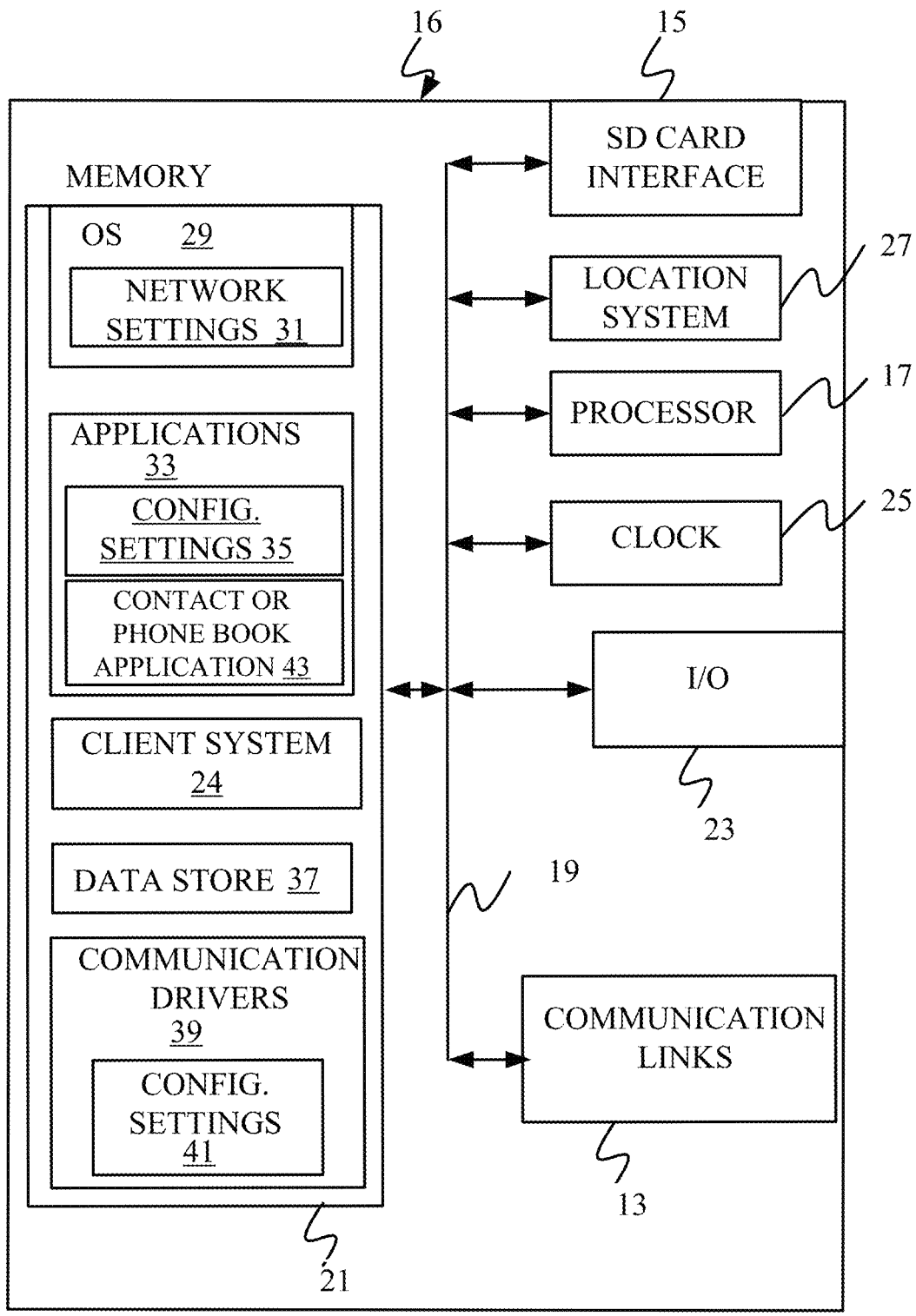
FIGS. 7-9 show examples of mobile devices that can be used in the architectures shown in the previous figures.
Figure 8:
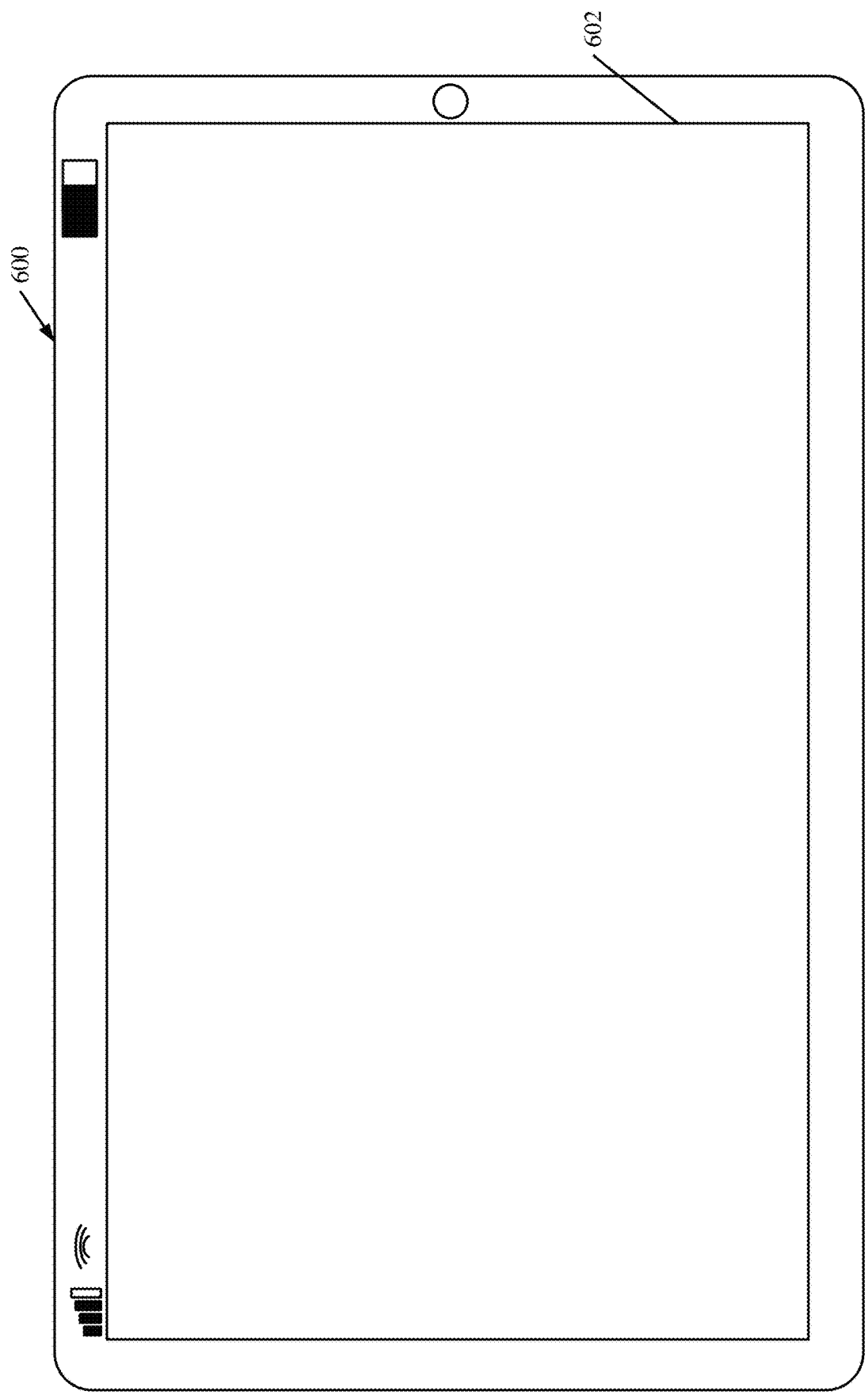
Figure 9:
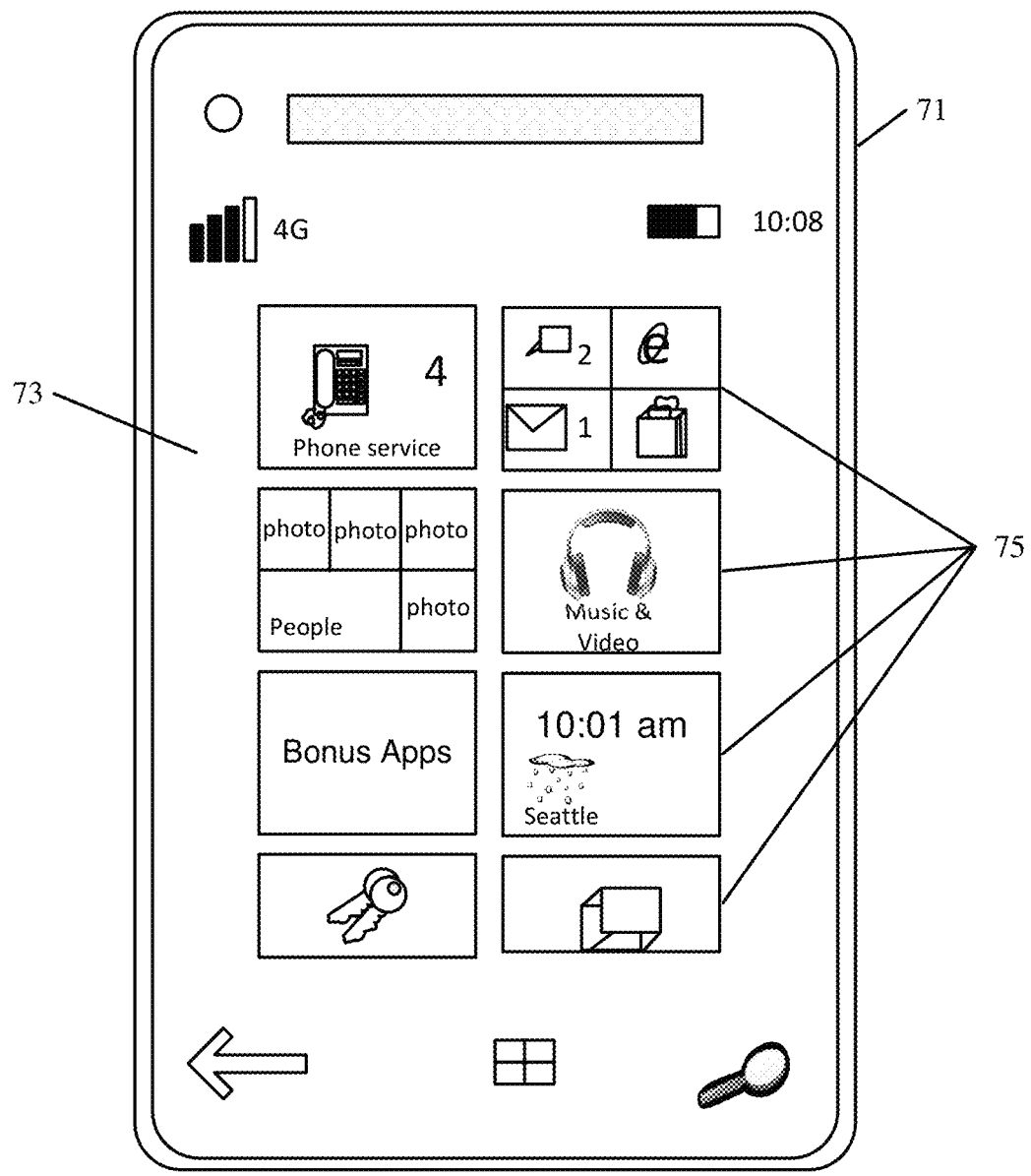

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

in other example, applications or systems are received on a removable Secure Digital (SD) card that is connected to a SD card interface 15. SD card interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one embodiment in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
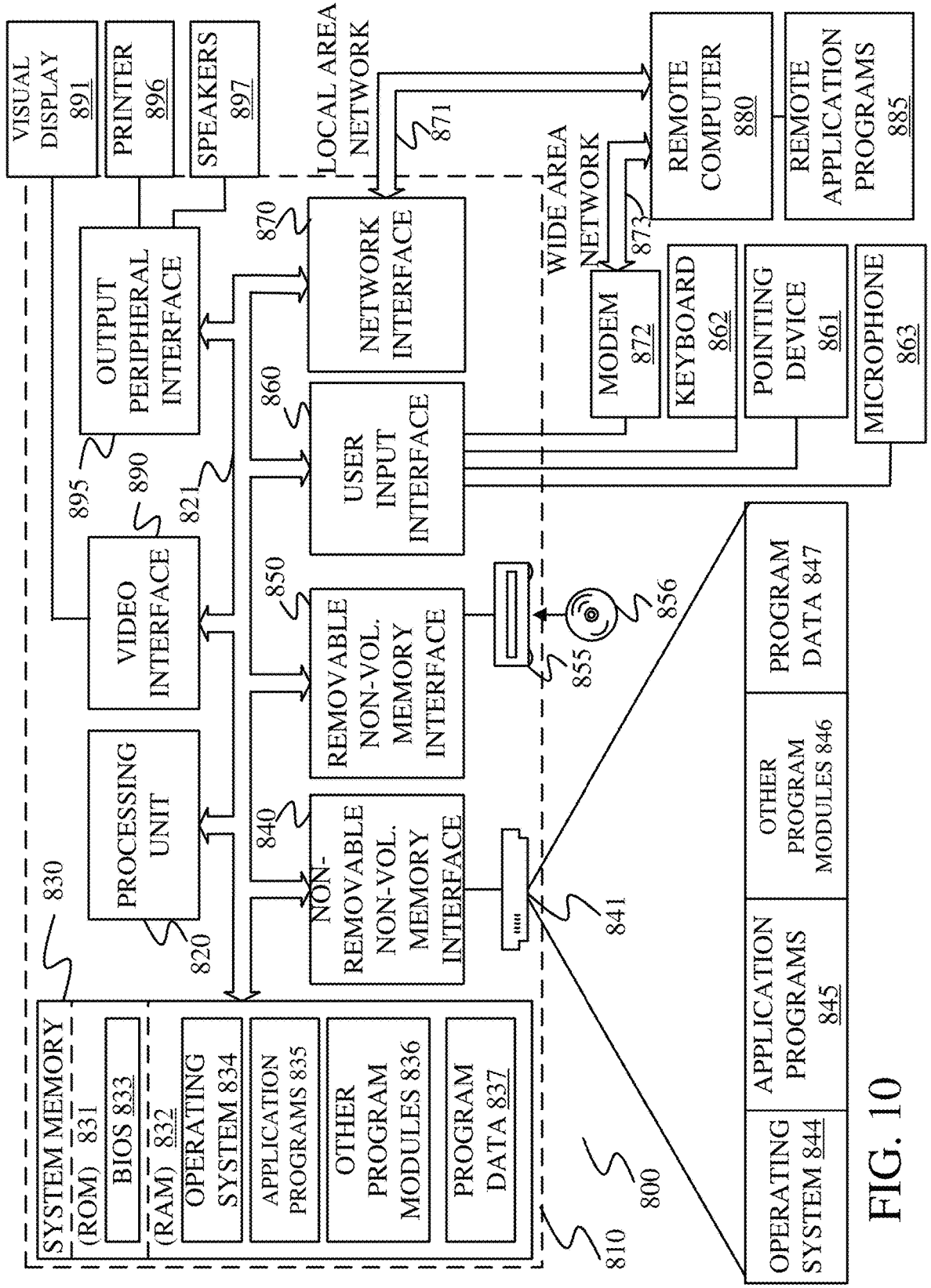
FIG. 10 is a block diagram of one example of a computing environment that can be used in the architectures shown in the previous figures.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1 and 2 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an electronic mail (email) system that generates a user interface with a reply pane for entering message content in reply to a received email message to generate a reply message;

a recipient processing system that detects a recipient entering content in reply to a particular textual portion of message content in the received email message and controls the email system to identify the particular textual portion as a subset of the message content in the received email message; and visual formatting logic that automatically controls the email system to format the content being entered by the recipient to display it in a same pane as the particular textual portion of the message content and to visually distinguish it from the particular textual portion of the message content and from other replies to the particular textual portion of the message content, by other recipients.

Example 2 is the computing system of any or all previous examples and further comprising:

question tag generator logic that tags the particular textual portion with a first tag indicating that the particular textual portion is an item that the content being entered by the recipient is in reply to.

Example 3 is the computing system of any or all previous examples and further comprising:

reply tag generator logic that tags the content being entered by the recipient with a second tag indicating that the content being entered by the recipient is in reply to the item tagged by the first tag.

Example 4 is the computing system of any or all previous examples wherein the recipient processing system comprises:

an in-line reply identifier that detects the recipient entering content in-line with the message content in the received email message and immediately following the particular textual portion in the received email message.

Example 5 is the computing system of any or all previous examples wherein the recipient processing system comprises:

a copy-and-paste identifier that detects the recipient copying the particular textual portion of the message content from the received email message into a reply message and further detects the recipient entering the content in reply to the particular textual portion immediately following the copied particular textual portion in the reply message.

Example 6 is the computing system of any or all previous examples and further comprising:

a linguistic content identifier that detects a linguistic interpretation of the content entered by the recipient, the linguistic interpretation indicating that the content entered by the recipient is in reply to the particular textual portion of the message content in the received email message.

Example 7 is the computing system of any or all previous examples wherein the recipient processing system comprises:

link generator logic that automatically generates a user actuatable link to user information corresponding to the recipient adjacent the content entered by the recipient.

Example 8 is the computing system of any or all previous examples and further comprising:

an author processing system that identifies whether the received message, when authored by an author, conforms to a predefined question schema; and message tag generator logic that generates a message tag indicating the received message conforms to the predefined question schema.

Example 9 is the computing system of any or all previous examples wherein the author processing system comprises:

character analysis logic that determines whether the received message, as it is authored, conforms to the predefined question schema based on characters entered in the message content.

Example 10 is the computing system of any or all previous examples wherein the author processing system comprises:

linguistic content analysis logic that determines whether the received message, as it is authored, conforms to the predefined question schema based on a linguistic interpretation of the message content.

Example 11 is the computing system of any or all previous examples wherein the author processing system comprises:

user interaction logic that determines whether the received message, as it is authored, conforms to the predefined question schema based on a user interaction.

Example 12 is the computing system of any or all previous examples and further comprising:

question tag generator logic that tags a plurality of different portions of the content in the received message as items that can be responded to by the recipient, based on the author processing system determining that the received message conforms to the predefined question schema.

Example 13 is a computer implemented method, comprising:

generating an electronic mail (email) user interface, in an email system, with a reply pane for entering message content in reply to a received email message to generate a reply message;

detecting a recipient entering content in reply to a particular textual portion of message content in the received email message;

controlling the email system to identify the particular textual portion as a subset of the message content in the received email message; and automatically controlling the email system to format the content being entered by the recipient to display it in a same pane as the particular textual portion of the message content and to visually distinguish it from the particular textual portion of the message content.

Example 14 is the computer implemented method of any or all previous examples wherein automatically controlling the email system to format the content comprises:

detecting another reply, from another recipient, to the particular textual portion; and automatically controlling the email system to format the content being entered by the recipient to visually distinguish it from the other reply from the other recipient.

Example 15 is the computer implemented method of any or all previous examples and further comprising:

tagging the particular textual portion with a first tag indicating that the particular textual portion is an item that the content being entered by the recipient is in reply to; and tagging the content being entered by the recipient with a second tag indicating that the content being entered by the recipient is in reply to the item tagged by the first tag.

Example 16 is the computer implemented method of any or all previous examples wherein detecting a recipient entering content in reply to a particular textual portion of message content comprises:

detecting the recipient entering content in-line with the message content in the received email message and immediately following the particular textual portion in the received email message.

Example 17 is the computer implemented method of any or all previous examples wherein detecting a recipient entering content in reply to a particular textual portion of message content comprises:

detecting the recipient copying the particular textual portion of the message content from the received email message into a reply message; and detecting the recipient entering the content in reply to the particular textual portion immediately following the copied particular textual portion in the reply message.

Example 18 is the computer implemented method of any or all previous examples wherein detecting a recipient entering content in reply to a particular textual portion of message content comprises:

detecting a linguistic interpretation of the content entered by the recipient, the linguistic interpretation indicating that the content entered by the recipient is in reply to the particular textual portion of the message content in the received email message.

Example 19 is a computing system, comprising:

an electronic mail (email) system that generates a user interface with a reply pane for entering message content in reply to a received email message to generate a reply message;

a recipient processing system that detects a recipient entering content in reply to a particular textual portion of message content in the received email message and controls the email system to identify the particular textual portion as a subset of the message content in the received email message, the recipient processing further identifying another reply, by another recipient, to the particular textual portion; and visual formatting logic that automatically controls the email system to format the content being entered by the recipient to display it in a same pane as the particular textual portion of the message content and to visually distinguish it from the particular textual portion of the message content and from the other reply to the particular textual portion of the message content, by the other recipient.

Example 20 is the computing system of any or all previous examples and further comprising:

question tag generator logic that tags the particular textual portion with a first tag indicating that the particular textual portion is an item that the content being entered by the recipient is in reply to.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

a processor; and memory storing instructions executable by the processor, wherein the instructions, when executed, configure the computing system to:

receive a first electronic mail (email) message in an email thread, the first email message having a plurality of users as recipients and including a plurality of textual portions;

access tag information associated with the plurality of textual portions in the first email message, the tag information correlating replies authored by the plurality of users in the email thread to the plurality of textual portions;

generate a user interface display for a first one of the users, the user interface display comprising:

a reply pane having one or more user input mechanisms configured to generate a reply email message that is in reply to the first email message; and a send actuator;

based on user input received from the first user through the one or more user input mechanisms of the reply pane, generate a plurality of user reply message content portions, each user reply message content portion corresponding to one of the textual portions in the first email message;

for each particular textual portion of the plurality of textual portions, identify, based on the tag information, other reply message content comprising a reply to the particular textual portion in the email thread by another one of the users; and automatically format the reply email message, that is displayed in the reply pane of the user interface display, to:

group, in the reply pane, the particular textual portion with both the user reply message content corresponding to the particular textual portion and the other reply message content corresponding to the particular textual portion, and visually distinguish the user reply message content in the reply pane from:

the particular textual portion, and the other reply message content; and send, in response to actuation of the send actuator, the formatted reply email message having each particular textual portion grouped with both the user reply message content corresponding to the particular textual portion and the other reply message content corresponding to the particular textual portion.

2. The computing system of claim 1 wherein the other reply message content is obtained from a plurality of other reply email messages by the users in the email thread.

3. The computing system of claim 2 wherein the instructions configure the computing system to:

tag a textual portion in the first email message with a first tag indicating that the textual portion is an item that the user reply message content being entered by the first user is in reply to; and tag the user reply message content being entered by the first user with a second tag indicating that the user reply message content being entered by the first user is in reply to the item tagged by the first tag.

4. The computing system of claim 1 wherein the instructions configure the computing system to:
   detect the first user entering content in-line with the plurality of textual portions in the first email message and immediately following a corresponding one of the textual portions in the first email message.

5. The computing system of claim 1 wherein the instructions configure the computing system to:
   detect the first user copying a given one of the textual portions from the first email message into the reply email message in the reply pane; and
   detect the first user entering reply message content in reply to the given textual portion immediately following the copied given textual portion in the reply email message.

6. The computing system of claim 1 wherein the instructions configure the computing system to:
   detect a linguistic interpretation of a given one of the reply message content portions entered by the first user, the linguistic interpretation indicating that the given reply message content portion entered by the first user is in reply to a corresponding one of the textual portions in the first email message.

7. The computing system of claim 1 wherein the instructions configure the computing system to:
   automatically generate a user actuatable link to user information corresponding to the first user adjacent one or more of the user reply message content portions entered by the first user.

8. The computing system of claim 1 wherein the instructions configure the computing system to:
   identify whether the first email message, when authored by an author, conforms to a predefined question schema; and
   generate a message tag indicating the first email message conforms to the predefined question schema.

9. The computing system of claim 8 wherein the instructions configure the computing system to:
   determine whether the first email message, as it is authored, conforms to the predefined question schema based on characters entered in the textual portions.

10. The computing system of claim 8 wherein the instructions configure the computing system to:
    determine whether the first email message, as it is authored, conforms to the predefined question schema based on a linguistic interpretation of the textual portions.

11. The computing system of claim 8 wherein the instructions configure the computing system to:
    determine whether the first email message, as it is authored, conforms to the predefined question schema based on a user interaction.

12. The computing system of claim 8 wherein the instructions configure the computing system to:
    tag a plurality of different portions, of the plurality of textual portions in the first email message as items that can be responded to by the first user, based on the author processing system determining that the first email message conforms to the predefined question schema.

13. A computer implemented method, comprising:
    receiving a first electronic mail (email) message in an email thread, the first email message having a plurality of users as recipients and including a plurality of textual portions;
    accessing tag information associated with the plurality of textual portions in the first email message, the tag information correlating replies authored by the plurality of users in the email thread to the plurality of textual portions;
    generating an electronic mail (email) user interface display for a first one of the users, the email user interface display comprising:
      a reply pane having one or more user input mechanisms configured to generate a reply email message that is in reply to the first email message; and
      a send actuator;
    based on user input received from the first user through the user input mechanism of the reply pane,
      generating a plurality of user reply message content portions, each user reply message content portion corresponding to one of the textual portions in the first email message;
    for each particular textual portion of the plurality of textual portions,
      identifying, based on the tag information, other reply message content comprising a reply to the particular textual portion in the email thread by another one of the users; and
      automatically formatting the reply email message, that is displayed in the reply pane of the user interface display, to:
        group, in the reply pane, the particular textual portion with both the user reply message content corresponding to the particular textual portion and the other reply message content corresponding to the particular textual portion, and
        visually distinguish the user reply message content in the reply pane from:
          the particular textual portion, and
          the other reply message content;
    sending, in response to actuation of the send actuator, the formatted reply email message having each particular textual portion grouped with both the user reply message content corresponding to the particular textual portion and the other reply message content corresponding to the particular textual portion.

14. The computer implemented method of claim 13 wherein the other reply message content is obtained from a plurality of other reply email messages by the users in the email thread.

15. The computer implemented method of claim 14 and further comprising:
    tagging a textual portion in the first email message with a first tag indicating that the textual portion is an item that the user reply message content being entered by the first user is in reply to; and
    tagging the user reply message content being entered by the first user with a second tag indicating that the user reply message content being entered by the first user is in reply to the item tagged by the first tag.

16. The computer implemented method of claim 14 and further comprising:
    detecting the first user entering content in-line with the plurality of textual portions in the first email message and immediately following a corresponding one of the textual portions in the first email message.

17. The computer implemented method of claim 14 wherein determining that the first reply message content is in reply to a particular textual portion of message content comprises:

detecting the first user copying a given one of the textual portions from the first email message into the reply email message; and detecting the first user entering reply message content in reply to the given textual portion immediately following the copied given textual portion in the reply email message.

18. The computer implemented method of claim 14, and further comprising:

detecting a linguistic interpretation of a given one of the reply message content portions entered by the first user, the linguistic interpretation indicating that the given reply message content portion entered by the first user is in reply to a corresponding one of the textual portions in the first email message.

* * * * *